L. KERBEL.
SELF FEEDER FOR THRESHING MACHINES.
APPLICATION FILED FEB. 26, 1914.
1,116,294.
Patented Nov. 3, 1914.
2 SHEETS—SHEET 1.
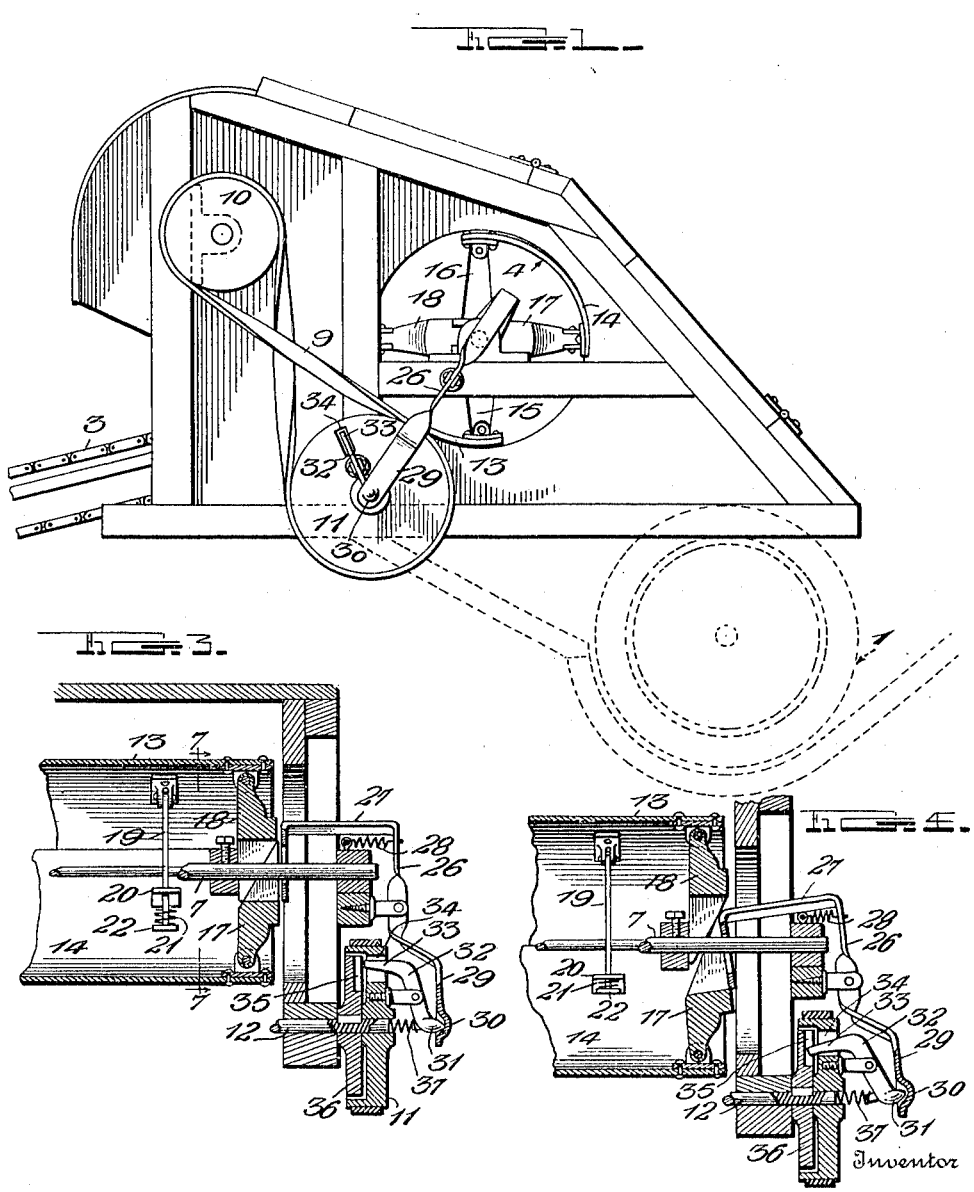
Witnesses
H. Woodard
J. Ralph Hogl
Inventor
Lambert Kerbel
By H. B. Wilson & Co.
Attorneys

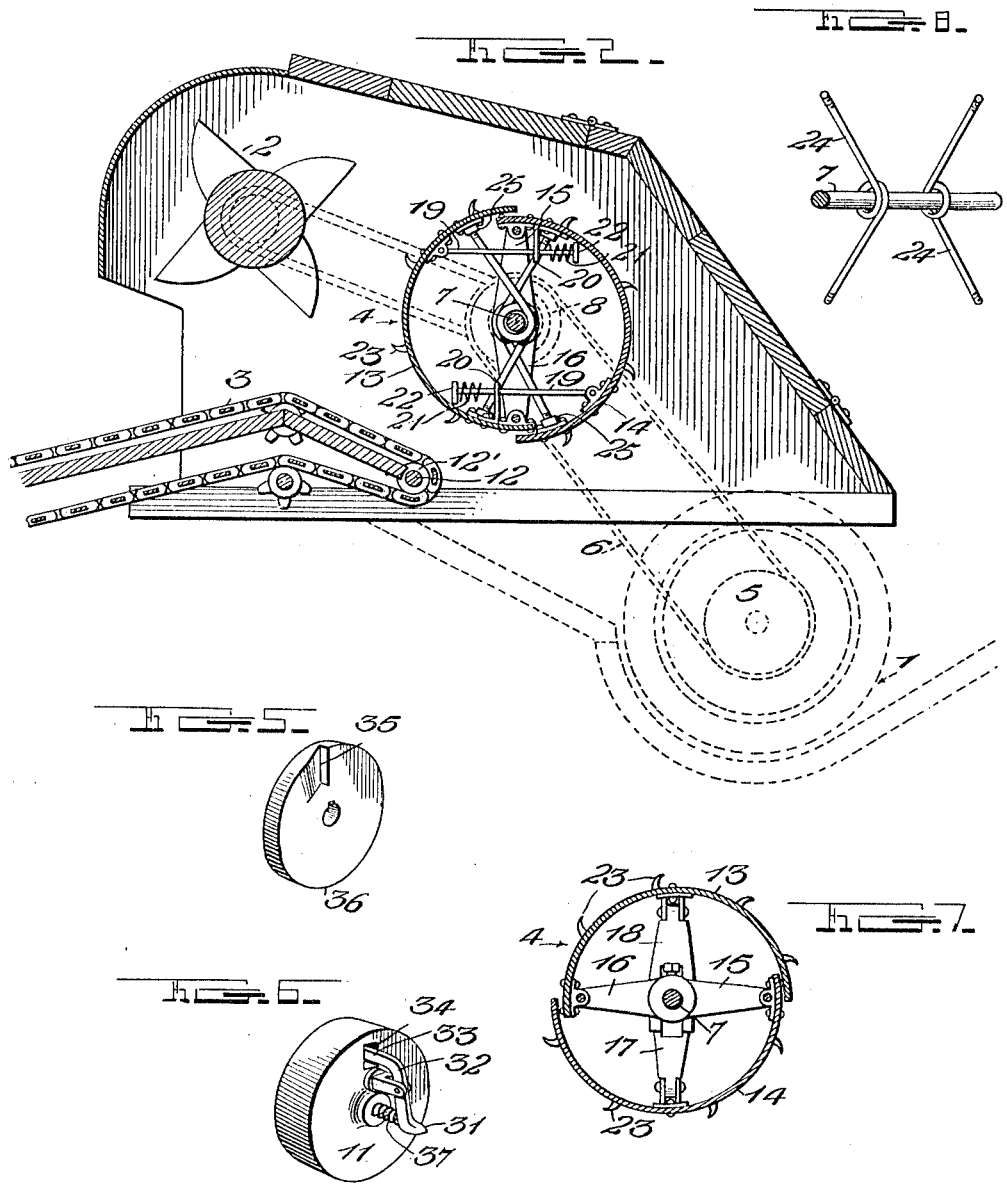

UNITED STATES PATENT OFFICE.

LAMBERT KERBEL, OF SPENCER, NEBRASKA.

SELF-FEEDER FOR THRESHING-MACHINES.

1,116,294.  Specification of Letters Patent.  Patented Nov. 3, 1914.

Application filed February 26, 1914. Serial No. 821,219.

*To all whom it may concern:*

Be it known that I, LAMBERT KERBEL, a citizen of the United States, residing at Spencer, in the county of Boyd and State of Nebraska, have invented certain new and useful Improvements in Self-Feeders for Threshing-Machines; and I do declare the following to be a full, clear, and exact description of the invention, such as will enable others skilled in the art to which it appertains to make and use the same.

This invention relates to improvements in self feeders for threshing machines.

The object of the invention is to provide simple and efficient mechanism for automatically throwing out of operation the feeding apron of a threshing machine should more material be fed thereby than the threshing cylinder can take care of, or should choking occur for any reason between the apron and the feeding cylinder.

With the above and other objects in view, the invention consists of certain novel features of construction, combination and arrangement of parts as will be more fully described and claimed.

In the accompanying drawings: Figure 1 represents an end elevation of a portion of a threshing machine equipped with this improvement; Fig. 2 is a transverse section thereof; Fig. 3 is an enlarged detail longitudinal sectional view through one end of the feeding cylinder and the parts connected therewith, showing the parts in the position assumed when the machine is not running; Fig. 4 is a similar view showing the parts in running position; Fig. 5 is a detail perspective view on one of the locking members on the apron operating shaft; Fig. 6 is a similar view of the other locking member; Fig. 7 is a transverse section of the feeding cylinder taken on the line 7—7 of Fig. 3; Fig. 8 is an enlarged detail of a portion of the shaft on which the feeding cylinder is mounted showing the supporting springs for the sections thereof.

In the embodiment illustrated a portion of a threshing machine is shown provided with the usual threshing cylinder 1 shown in dotted lines in Figs. 1 and 2, band cutter 2, feeding apron 3 and a feeding cylinder 4 which latter is peculiarly constructed for throwing out of operation the feeding apron should choking occur between said cylinder and apron and which will be hereinafter more fully described.

The threshing cylinder 1 is driven from any suitable source of power (not shown) and by means of a pulley 5 and belt 6 imparts motion to the shaft 7 on which the feeding cylinder 4 is mounted, said belt 6 passing over a pulley 8 fixed to said shaft 7. Motion is imparted from the shaft 7 to the band cutter 2 through a belt and pulley connection and the band cutter drives the apron 3 by means of a belt 9 passing over pulleys 10 and 11 mounted respectively on the band cutter shaft and the apron shaft 12.

The feeding cylinder 4 is shown constructed in semi-cylindrical sections 13 and 14 the edges of which overlap when the parts are assembled, as shown in Figs. 2 and 7. These sections 13 and 14 are mounted on the shaft 7 by means of rigid spokes or arms 15 and 16 which are fixed to the shaft 7 and extend in opposite directions therefrom, it being understood that two or more sets of these arms are employed while one only is shown in the drawings. The free ends of the arms 15 are secured to the section 14 on its inner face near one edge thereof while the free ends of the arms 16 are secured to the other section 13 adjacent the opposite edge thereof as is shown clearly in Fig. 7, the free edges of said sections overlapping the edges which are secured to the arms 15 and 16 to provide for contracting and expanding of said sections relative to each other for a purpose to be described.

Spokes or arms 17 and 18 are pivotally connected at one end to the sections 13 and 14 intermediately of the side edges thereof as is shown clearly in Fig. 7 and the free ends of these arms are bifurcated and straddle, the shaft 7 being arranged in overlapping engagement with their adjacent faces made wedge shaped as shown clearly in Figs. 3 and 4, these wedge shaped faces being adapted to slide on each other when the sections of the cylinder are contracted or expanded for a purpose to be described.

The sections 13 and 14 of the feeding cylinder are yieldably connected transversely by means of links or rods 19 which are pivoted at one end to one section and slidably engage apertured lugs 20 on the other section, having coiled springs 21 mounted thereon between the lugs 20 and nuts 22 secured to the free ends thereof. These links or rods 19 form stops for limiting the expansion of the sections relative to each other as well as means for holding them against lateral separation. These cylinder sections are provided with the usual feeding spurs or fingers 23 any desired number of which may be employed. The sections 13 and 14 are further held in yieldable relation by means of springs 24 which are coiled around the shaft 7 midway their ends and the free ends of said springs are threaded and engaged with threaded bosses 25 disposed on the inner faces of the sections 13 and 14 preferably near the side edges thereof, one of the springs being connected at its opposite ends to one section and the other spring at its opposite ends to the other section as is shown clearly in Fig. 2 and which exert their tension for holding the sections normally in expanded position.

A lever 26 is fulcrumed on the machine frame adjacent one end of the feeding cylinder 4 and has an arm 27 extending laterally inward therefrom having its free end inturned and here shown disposed at right angles to the body portion of the arm 27 and apertured for slidable engagement with the shaft 7 and positioned to bear normally against the outer face of the spoke 18 as is shown clearly in Fig. 4. A coiled spring 28 connects the lever 26 near the arm 27 therewith with the frame of the machine and said spring exerts its tension to hold the inturned end of said arm 27 in engagement with the spoke 18. The other end of the lever 26 is offset as shown at 29 and is preferably provided at its terminal with an indentation 30 adapted to receive an outwardly extending tooth or nose 31 formed on one end of a dog 32 pivotally mounted on the pulley 11. The other end of this dog 32 has an inwardly extending tooth or nose 33 which extends through an aperture 34 in the pulley 11 into the path of a tooth 35 formed on the adjacent face of a wheel or disk 36 keyed to the shaft 12 which actuates the apron 3. The free end of the lever 26 which has the indentation 30 therein is disposed in alinement with the shaft 12 as is shown clearly in Figs. 1, 3, and 4 and the nose 31 of the dog 32 is normally engaged with this indentation. A coiled spring 37 is disposed between the pulley 11 and the end of the dog having the nose 31 thereon and exerts its tension to force said nose yieldably into engagement with the indentation 30 of the lever 26.

While one tooth 35 only is shown in the wheel or disk 36 it is obvious that any desired number may be employed and that when the inwardly extending nose or tooth 33 of the dog 32 passes through the aperture of the pulley 11 and engages the tooth 35 of the disk or wheel 36, it will be obvious that said pulley is locked in engagement with said wheel and the rotation of the pulley will cause the disk to turn with it and through said disk will impart motion to the shaft 12 and to the apron 3 mounted on said shaft, said apron passing over suitable sprocket wheels 12' fixed on the shaft 12 as is shown clearly in Fig. 2.

From the above description it will be obvious that the sections 13 and 14 of the feeding cylinder 4 are yieldably held apart by the springs 24 and may be contracted or collapsed when pressure is exerted on the outer faces of said sections such as would occur should sufficient material accumulate in the space between said feeding cylinder and the apron 3 to choke said space, and the pressure exerted by this material would cause the cylinder sections to contract and thereby move the spokes 17 and 18 inwardly toward each other into the position shown in Fig. 3. This inward or telescoping action of the spokes causes the end of the lever 26 carrying the arm 27 to move outwardly and its opposite end to move inwardly thereby forcing the end of the dog having the nose 31 thereon toward the pulley 11 causing its opposite end to move outwardly and disengage its nose 33 from the tooth 35 of the disk 36 thus permitting the pulley 11 to revolve without imparting motion to the shaft 12 which drives the apron 3. It will thus be obvious that the apron 3 will be thrown out of operation and no further material fed to the threshing cylinder until the parts are restored to normal position which would occur when the passage between the feeding cylinder is unchoked thereby relieving the pressure on the sections of said feeding cylinder and permitting them to expand under the action of the springs 24. When this expanding action takes place the spokes 17 and 18 will move outwardly into position shown in Fig. 4 thereby permitting the end of arm 27 to move inwardly under the action of the spring 28 and force the end of the lever 26 carrying the indentation 30 outwardly and permit the coiled spring 37 which bears against the end of the dog having the nose 31 thereon to move said end outwardly thereby forcing the opposite end of the dog inwardly to cause the tooth or nose 33 thereof to extend into the path of the tooth 35 on the disk 36 and engage said tooth thus locking the pulley 11 to said disk and through these members imparting motion to the apron driving shaft 12. The feeding of the material of the apron 3 will then proceed in the usual manner and the parts will remain in the position shown in Fig. 4, until pressure is again exerted on the cylinder sections 13 and 14 sufficient to cause them to contract when the operation above described will be repeated.

Having thus described my invention, what I claim is:—

1. A self feeder for threshing machines including a feeding apron, a shaft for actuating said apron, a feeding cylinder located adjacent said apron with a feed passage between them, and collapsible and expansible means for throwing said apron out of operation on the choking of the feed passage.

2. A self feeder for threshing machines including a feeding apron, a shaft for actuating said apron, a collapsible and expansible feeding cylinder located adjacent said apron and having a feed passage between them, and coöperating means on said cylinder and apron-actuating shaft operable on the collapse of said cylinder for throwing said apron out of operation.

3. A self feeder for threshing machines including a feeding apron, a shaft for actuating said apron, a feeding cylinder located adjacent said apron with a feed passage between them, coöperating means on said cylinder and apron actuating shaft for throwing said apron out of operation on the choking of the feed passage and collapsible and expansible means for automatically restoring said apron to operation when the choking in the feed passage is relieved.

4. A self feeder for threshing machines including a feeding apron, a shaft for actuating said apron, a feeding cylinder located adjacent said apron with a feed passage between them, said cylinder being composed of transversely contractible and expansible sections yieldably held in expanded position, and means on said apron-actuating shaft controlled by the contraction and expansion of said cylinder for throwing said apron into and out of operation.

5. A self feeder for threshing machines including a feed apron, a shaft for actuating said apron, a feeding cylinder located adjacent said apron with a feed passage between them, said cylinder being composed of transversely contractible and expansible sections, said sections having their side edges overlapping, means within said cylinder for yieldably holding said sections in expanded position, and coöperating means on said cylinder and apron actuating shaft for throwing said apron out of operation.

6. A self-feeder for threshing machines including a feed apron, a shaft for actuating said apron, a feeding cylinder located adjacent said apron with a feed passage between them, said cylinder being composed of transversely contractible and expansible sections, said sections having their side edges overlapping, means within said cylinder for yieldably holding said sections in expanded position, a lever having one end arranged adjacent one end of said cylinder and its other end adjacent said shaft and means on said shaft and cylinder sections disposed in the path of said lever ends and operable on the contraction of the cylinder sections to throw said apron out of operation.

7. A self feeder for threshing machines including a feeding apron, a shaft for actuating said apron, a feeding cylinder located adjacent said apron with a feed passage between them, said cylinder being composed of transversely contractible and expansible sections, said sections having their side edges overlapping, means within said cylinder for yieldably holding said sections in expanded position, said sections having transversely extending members slidable on each other, the sliding faces of said members being wedge-shaped, a lever having one end arranged adjacent one of said sliding members and its other end adjacent said shaft, and means on said shaft disposed in the path of the last mentioned end of said lever operable on the contraction of the cylinder sections to throw said apron out of operation.

8. A self feeder for threshing machines including a feeding apron, a shaft for actuating said apron, a feeding cylinder located adjacent said apron with a feed passage between them, said cylinder being composed of transversely contractible and expansible sections, said sections having their side edges overlapping, means within said cylinder for yieldably holding said sections in expanded position, said sections having transversely extending members slidable on each other, the sliding faces of said members being wedge shaped, a lever having one end arranged adjacent one of said sliding members and its other end adjacent said shaft, a driving pulley loosely mounted on said shaft, a toothed member fixed to said shaft adjacent said pulley, and a dog mounted on said pulley having one end positioned to be engaged by the last mentioned end of said lever and its other end to engage said toothed member on said shaft when said cylinder sections are expanded whereby the apron is actuated by said shaft.

9. In a threshing machine, the combination of a transversely collapsible feeding cylinder, yieldable means for holding said cylinder in expanded position, means within said cylinder for limiting its expansion, a feeding apron, a driving shaft for said apron having a toothed disk fixed thereon, a driving pulley loosely mounted on said shaft adjacent said disk, a dog mounted on said pulley and having a nose adapted to be disposed in the path of said toothed disk, and means operable by the expansion of said cylinder for forcing said nose into engagement with said toothed disk for throwing the apron into operation.

10. In a threshing machine, the combination of a transversely collapsible feeding cylinder, yieldable means for holding said cylinder in expanded position, means within said cylinder for limiting its expansion, a feeding apron, a driving shaft for said apron having a toothed disk fixed thereon, a driving pulley loosely mounted on said shaft adjacent said disk, a dog mounted on said pulley and having a nose adapted to be disposed in the path of said toothed disk, means operable by the expansion of said cylinder for forcing said nose into engagement with said toothed disk for throwing the apron into operation, and means controlled by the contraction of said cylinder for disengaging said dog from said disk and throwing the apron out of operation.

11. In a threshing machine, the combination of a transversely collapsible feeding cylinder, yieldable means for holding said cylinder in expanded position, means within said cylinder for limiting its expansion, a feeding apron, a driving shaft for said apron having a toothed disk fixed thereon, a driving pulley loosely mounted on said shaft adjacent said disk, a dog mounted on said pulley and having a nose adapted to be disposed in the path of said toothed disk, means operable by the expansion of said cylinder for forcing said nose into engagement with said toothed disk for throwing the apron into operation, and a lever controlled by the expansion and contraction of said cylinder for throwing said apron into and out of operation.

12. In a threshing machine, the combination of a feeding cylinder composed of transversely contractible sections, means for yieldably holding said sections in expanded position, arms pivotally mounted at one end to the inner faces of said sections and their other ends arranged in sliding engagement, the engaging faces of said arms being wedge-shaped, an apron, a shaft for actuating said apron, a toothed disk fixed on said shaft, a driving pulley loosely mounted on said shaft adjacent said disk, a dog pivoted on said pulley and having one end disposed in the path of said disk, a lever fulcrumed on said machine and having one end positioned in the path of one of said sliding arms of said cylinder and its other end positioned adjacent said dog, means for yieldably holding said dog in engagement with said lever, and means for yieldably holding the other end of said lever in contact with one of said sliding members of the cylinder, said sliding members being operable on the expansion of the cylinder sections to force said dog engaged end of said lever outward thereby throwing said apron into operation.

13. A feeding cylinder for a threshing machine comprising semi-cylindrical sections having their side edges disposed in overlapping relation, links on one section slidably engaged with the other section, shock absorbing springs on said links, a shaft extending through said cylinder, springs mounted on said shaft and engaged with said sections for holding said sections yieldably in expanded position, and rigid arms fixed to said shaft, one of said arms being connected with one of said sections and the other with the other section.

14. A feeding cylinder for a threshing machine comprising semi-cylindrical sections having their side edges disposed in overlapping relation, links on one section slidably engaged with the other section, shock absorbing springs on said links, a shaft extending through said cylinder, springs mounted on said shaft and engaged with said sections for holding said sections yieldably in expanded position, rigid arms fixed to said shaft, one of said arms being connected with one of said sections and the other with the other section, said arms being connected with said sections adjacent their side edges, arms slidably mounted on said shaft and pivotally connected at one end to said sections midway the width thereof, said arms having their sliding faces wedge-shaped, and means on said shaft disposed in the path of one of said arms and adapted to control the actuation of the feeding apron.

15. A feeding cylinder for a threshing machine comprising semi-cylindrical sections having their side edges disposed in overlapping relation, links on one section slidably engaged with the other section, shock absorbing springs on said links, a shaft extending through said cylinder, springs mounted on said shaft and engaged with said sections for holding said sections yieldably in expanded position, rigid arms fixed to said shaft, one of said arms being connected with one of said sections and the other with the other section, said arms being connected with said sections adjacent their side edges, arms slidably mounted on said shaft and pivotally connected at one end to said sections midway the width thereof, said arms having their sliding faces wedge shaped, means on said shaft disposed in the path of one of said arms and adapted to control the actuation of the feeding apron, and a lever having one end slidably mounted on said shaft and disposed in the path of one of said arms and adapted to control the operation of an apron actuating shaft.

16. In a threshing machine, the combination of a feeding cylinder composed of transversely contractible and expansible sections, a feeding apron with a feed passage disposed between said apron and cylinder, a shaft for actuating said apron, a toothed disk fixed on said apron shaft, a driving pulley loosely mounted on said shaft and having an aperture extending transversely therethrough, a dog pivoted on said pulley and having a nose at one end extending through the aperture in said pulley into the path of said toothed disk, a nose on the other end of said dog extending outwardly, a spring for normally forcing said last mentioned nose outwardly, a lever fulcrumed on said machine and having one end positioned in the path of the outwardly extending nose of the dog, the other end of said lever being arranged adjacent said feeding cylinder and means on said cylinder for coöperating with said lever end on the expansion of said cylinder sections to permit said dog to engage said toothed disk whereby the apron is thrown into operation.

In testimony whereof I have hereunto set my hand in presence of two subscribing witnesses.

LAMBERT KERBEL.

Witnesses:
U. S. ADAMS,
E. C. HAMILTON.

Copies of this patent may be obtained for five cents each, by addressing the "Commissioner of Patents, Washington, D. C."